United States Patent [19]

Bartlett et al.

[11] Patent Number: 4,927,863

[45] Date of Patent: May 22, 1990

[54] PROCESS FOR PRODUCING CLOSED-CELL POLYURETHANE FOAM COMPOSITIONS EXPANDED WITH MIXTURES OF BLOWING AGENTS

[75] Inventors: Philip L. Bartlett; Joseph A. Creazzo, both of Wilmington, Del.

[73] Assignee: E. I. du Pont de Nemours and Company, Wilmington, Del.

[21] Appl. No.: 408,393

[22] Filed: Sep. 18, 1989

Related U.S. Application Data

[63] Continuation of Ser. No. 158,442, Feb. 2, 1988, abandoned.

[51] Int. Cl.$^5$ .................................................. C08J 9/00
[52] U.S. Cl. ........................................ 521/131; 521/119
[58] Field of Search ................................... 521/119, 131

[56] References Cited

U.S. PATENT DOCUMENTS

| 3,322,881 | 7/1967 | Burt et al. | 252/162 |
|---|---|---|---|
| 3,741,918 | 6/1973 | Koleski et al. | 521/119 |
| 3,865,761 | 2/1975 | Schnabel | 521/119 |
| 4,055,054 | 10/1977 | Murphy et al. | 62/114 |
| 4,076,644 | 2/1978 | Burt et al. | 252/182 |
| 4,442,237 | 4/1984 | Zimmerman et al. | 521/131 |
| 4,575,521 | 3/1986 | Côté et al. | 521/131 |
| 4,579,875 | 4/1986 | Goel | 521/131 |
| 4,624,970 | 11/1986 | Dwyer et al. | 521/131 |
| 4,636,529 | 1/1987 | Crooker | 521/131 |
| 4,642,319 | 2/1987 | McDaniel | 521/131 |
| 4,699,932 | 10/1987 | Fuzesi et al. | 521/131 |
| 4,713,400 | 12/1987 | Zwolinski et al. | 521/131 |
| 4,714,717 | 12/1987 | Londrigan et al. | 521/131 |

FOREIGN PATENT DOCUMENTS

| 0034832 | 3/1982 | Japan | 521/119 |
|---|---|---|---|
| 62-18418 | 1/1987 | Japan . | |

*Primary Examiner*—John Kight
*Assistant Examiner*—Dennis R. Daley

[57] ABSTRACT

A process is disclosed comprising mixing selected shrinkage-minimizing halocarbons with selected two-carbon hydrogen-containing halocarbons, HCFC-123, HCFC-123a and HCFC-141b, and using this mixture as a blowing agent to produce minimal shrinkage closed-cell polyurethane foams.

9 Claims, No Drawings

PROCESS FOR PRODUCING CLOSED-CELL POLYURETHANE FOAM COMPOSITIONS EXPANDED WITH MIXTURES OF BLOWING AGENTS

This application is a continuation of application Ser. No. 158,442 filed Feb. 2, 1988, now abandoned.

FIELD OF THE INVENTION

This invention relates to closed-cell polyurethane foams expanded with mixtures of blowing agents comprising the two-carbon hydrogen-containing halocarbons HCFC-123, HCFC-123a and HCFC-141b and selected shrinkage-minimizing halocarbons to produce minimal shrinkage polyurethane foams.

BACKGROUND OF THE INVENTION

In 1985, about .140 MM lbs. of blowing agents (primarily CFC-11 and CFC-12) were used in the U.S. to produce all types of insulation foams. Of this total volume, about 70% or 100 MM lbs. were used to make polyurethane foam. Closed-cell polyurethane foam is the most energy efficient insulating material available, having an R value of approximately 7.2 per inch; whereas fiberglass has an R value of approximately 3.1 per inch.

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place urethane foams are used, for example, in appliances such as refrigerators and freezers plus they are used in making refrigerated trucks and rail cars.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are widely used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured has exceeded the level produced in 1978 (before the U.S. ban).

During the period of 1978-1987, much research was conducted to study the ozone depletion theory. Because of the complexity of atmospheric chemistry, many questions relating to this theory remain unanswered. However, if the theory is valid, the health risks which would result from depletion of the ozone layer are significant. This, coupled with the fact that world-wide production of chlorofluorocarbons has increased has resulted in international efforts to reduce chlorofluorocarbon use. Particularly, in Sept. 1987, the United Nations through its Environment Programme (UNEP) issued a tentative proposal calling for a 50 percent reduction in worldwide production of fully halogenated chlorofluorocarbons by the year 2000.

Because of this proposed reduction in availability of fully halogenated chlorofluorocarbons such as CFC-11 and CFC-12, alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The accompanying Table lists the ozone depletion potential for a variety of fully and partially halogenated halocarbons. Greenhouse potential data (potential for reflecting infrared radiation (heat) back to earth and thereby raising the earth's surface temperature) are also shown.

| OZONE DEPLETION AND GREENHOUSE POTENTIALS | | |
|---|---|---|
| Blowing Agent | Ozone Depletion Potential* | Greenhouse Potential** |
| CFC-11 ($CFCl_3$) | 1.0 | 0.4 |
| CFC-12 ($CF_2Cl_2$) | 0.9 | 1.0 |
| HCFC-22 ($CHF_2Cl$) | 0.05 | 0.07 |
| HCFC-123 ($CF_3CHCl_2$) | less than 0.05 | less than 0.1 |
| HCFC-124 ($CF_3CHFCl$) | less than 0.05 | less than 0.1 |
| HFC-134a ($CF_3CH_2F$) | 0 | less than 0.1 |
| HCFC-141b ($CFCl_2CH_3$) | less than 0.05 | less than 0.1 |
| HCFC-142b ($CF_2ClCH_3$) | less than 0.5 | less than 0.2 |
| HFC-152a ($CHF_2CH_3$) | 0 | less than 0.1 |

*Calculated relative to CFC-11.
**Calculated relative to CFC-12.

Halocarbons such as HCFC-123, HCFC 123a and HCFC-141b are environmentally acceptable in that they theoretically have minimal effect on ozone depletion. However, these halocarbons cause cell shrinkage or collapse when used as blowing agents for closed-cell polyurethane foams. This shrinkage is particularly apt to occur with relatively flexible polymers such as those prepared from polyether polyols and when the closed-cell polyurethane foam is a low density foam, e.g., less than about 2.0 lbs./cu. ft., particularly about 1.5 lbs./cu.ft. As compared to higher density foams, the production of lower density foams generally requires a larger quantity of blowing agent and a smaller amount of polymer which results in thinner and, consequently, weaker cell walls. In addition, the halocarbon blowing agents may migrate from the cell cavities to the bulk polymer and soften or plasticize the already thin cell walls.

Finally, foam cells are most fragile just after preparation as the temperature of the foamed polyurethane returns to ambient. At the temperature at which foams are made, which normally reaches about 200°-300° F.

because of the exothermic reaction between polyol and isocyanate, the cells contain blowing agent at one atmosphere pressure. However, after cooling to ambient temperature, foams typically contain blowing agent at less than atmospheric pressure. Since this creates a partial vacuum in the cells, they will shrink to smaller volumes if the cell walls are weak, soft or very thin. Generally, this shrinkage occurs within 72 hours of preparation and before the polymer in the cell walls fully cures and hardens. This shrinkage or collapse of foams is undesirable and results in:

(a) loss of insulation value;
(b) loss of structural strength;
(c) pulling away of foam from walls, e.g., walls of a refrigerator.

Such shrinkage or collapse of polyurethane insulation foam makes these halocarbons unattractive as blowing agents. It might be possible, however, to reformulate the polyurethane foam formulations to be more compatible with these halocarbons. Such a solution would require a complete study of the preparation/properties/uses of new formulations and would require a considerable period of time for development. Long term, new or modified polymer systems designed for use with these halocarbons and other more polymer-soluble blowing agents will most likely be developed; however, what is needed, as fully halogenated chlorofluorocarbon blowing agents face regulation and usage restriction, are blowing agent systems which can be used in present, essentially unmodified, polyurethane foam formulations.

SUMMARY OF THE INVENTION

A Process has been discovered comprising mixing at least 1 wt. percent and less than about 60 wt. percent of a shrinkage-minimizing halocarbon selected from the group consisting of CFC-11, CFC-12, HCFC-22, HFC-32, CFC-113, CFC-114, HCFC-124, HCFC-133a, HFC-134a, HCFC-142b and HFC-152a and a minimum of about 40 wt. percent of a two-carbon hydrogen-containing halocarbon selected from the group consisting of HCFC-123, HCFC-123a and HCFC-141b, to form a mixture, and, thereafter, using the mixture to produce a minimal shrinkage closed-cell polyurethane foam.

Also included are minimal shrinkage closed-cell polyurethane foams which have been formed using the mixture of the instant invention.

DETAILED DESCRIPTION OF THE INVENTION

By minimal shrinkage closed-cell polyurethane foam is meant a closed-cell polyurethane foam which is formed using the mixture of the instant invention which foam decreases in volume by less than ten (10) percent after it is allowed to stand at atmospheric pressure for at least seventy-two (72) hours after formation as compared to the foam's original volume.

The closed-cell polyurethane foams of the instant invention include all types of closed-cell polyurethane foams including:

1. pour-in-place appliance foams, normally made by the reaction of a polyether polyol with an isocyanate, approximately on a 1/1 isocyanate equivalent/hydroxyl equivalent basis. An isocyanate index of 105 is common. The isocyanate chosen may be of the toluene diisocyanate (TDI) or polymethylene polyphenyl isocyanate (MDI) type. The polyether polyols may be various polyhydroxy compounds which may be polyethylene glycols, polypropylene glycols, mixed PEO-PPO-based glycols, reaction products of sugars or aminoalcohols and ethylene oxide and/or propylene oxide, etc.

2. board stock (isocyanurate) foams, normally made by the reaction of an aromatic polyester polyol (may be a mixture of polyester/polyether polyols) with an isocyanate (MDI) in the ratio of isocyanate equivalent to hydroxyl equivalent of 1.5-6.0. Aromatic polyester polyols may differ considerably in structure. For example, a polyester polyol may be made by the transesterification of polyethylene terephthalate (PET) scrap with a glycol such as diethylene glycol or a polyester polyol may be made from phthalic anhydride plus a glycol.

Unexpectedly, the two-carbon hydrogen-containing halocarbons of this invention, 1,1-dichloro-2,2,2-trifluoroethane (HCFC-123), 1,2-dichloro-1,1,2-trifluoroethane (HCFC-123a) and 1,1-dichloro-1-fluoroethane (HCFC-141b), in combination with selected shrinkage-minimizing halocarbons, trichloromonofluoromethane (CFC-11), dichlorodifluoromethane (CFC-12), monochlorodifluoromethane (HCFC-22), difluoromethane (HFC-32), 1,1,2-trichlorotrifluoroethane (CFC-113), 1,2-dichlorotetrafluoroethane (CFC-114), 1-chloro-1,2,2,2-tetrafluoroethane (HCFC-124), 1-chloro-2,2,2-trifluoroethane (HCFC-133a), 1,1,1,2-tetrafluoroethane (HFC-134a), 1-chloro-1,1-difluoroethane (HCFC-142b) and 1,1-difluoroethane (HFC-152a), form blowing agent mixtures which can produce minimal shrinkage closed-cell polyurethane foams. The use of the two-carbon hydrogen-containing halocarbons as the sole blowing agents produce closed-cell polyurethane foams which have much greater shrinkage. The mixtures of the instant invention produce closed-cell polyurethane foams which, unexpectedly, shrink less than one would expect from a simple mixing of the two-carbon hydrogen-containing halocarbons with the selected shrinkage-minimizing halocarbons.

The two-carbon hydrogen-containing halocarbons of the instant invention, HCFC-123, HCFC-123a and HCFC-141b, are known in the art and can be prepared by known methods. The shrinkage-minimizing halocarbons of the instant invention, CFC-11, CFC-12, HCFC-22, HFC-32, CFC-113, CFC-114, HCFC-124, HCFC-133a, HFC-134a, HCFC-142b and HFC-152a, are also known in the art and can be prepared by known methods.

It has been found that at least 1 wt. percent and less than about 60 wt. percent of the shrinkage-minimizing halocarbons of this invention can be combined with a minimum of about 40 wt. percent of the two-carbon hydrogen-containing halocarbons of the instant invention to form the mixtures of this invention.

Of the total blowing agent mixture, the effective quantity of CFC-11, CFC-12, HCFC-22, HFC-32, CFC-113, CFC-114, HCFC-124, HCFC-133a, HFC-134a, HCFC-142b and HFC-152a can be at least 1 wt. percent and less than about 60 wt. %, preferably, about 5 to 59 wt. percent, and more preferably, about 10 to 40 wt. percent. The remainder of the mixture is two-carbon hydrogen-containing halocarbons, such as HCFC-123.

Concentrations of CFC-11 in HCFC-123/CFC-11 mixtures of less than about 5 wt. percent up to about 40 wt. percent function unexpectedly to prevent foam shrinkage associated with the presence of HCFC-123. In addition, this concentration range permits making lower density foams, 1.5-2.5 lbs./cu.ft. (lower density gives lower K-factor and better insulation) than would be possible with HCFC-123 alone, since low density foams shrink most when HCFC-123 is used as the sole blowing agent.

Concentrations of CFC-11 in HCFC-123/CFC-11 blends of 40 to 60 wt. percent function to permit preparation of very low density foams (density of 1.2–1.5 lbs./cu.ft.) without shrinkage, which are the best insulating foams and which would be difficult or impossible to produce with HCFC-123 alone.

The use of the preferred blend of HCFC-123/HCFC-11 in the ratio of about 80/20 wt. percent, for example, limits shrinkage of a polyurethane foam to less than one percent compared to the foam's original volume. This compares to a shrinkage of about 35% for a foam which is formed using HCFC-123 as the sole blowing agent. CFC-12, HCFC-22, HFC-32, CFC-113, CFC-114, HCFC-124, HCFC-133a, HFC-134a, HCFC-142b and HFC-152a also unexpectedly reduce/prevent appreciable cell collapse/shrinkage as compared to a polyurethane foam which has been formed using HCFC-123 as the sole blowing agent.

HCFC-123a and HCFC-141b, used alone, also cause excessive foam cell shrinkage. Mixtures of the two-carbon hydrogen-containing halocarbons can also be used. When up to but less than 60 wt. percent of CFC-11, CFC-12, HCFC-22, HFC-32, CFC-113, CFC-114, HCFC-124, HCFC-133a, HFC-134a, HCFC-142b and/or HFC-152a, either individually or together, are blended with the two-carbon hydrogen-containing halocarbons, either individually or together, minimal shrinkage closed-cell polyurethane foams can be produced.

The mixtures of the instant invention can be prepared in any manner convenient to the preparer including simply weighing desired quantities of each component and, thereafter, combining them in an appropriate container.

Polyurethane foams are generally prepared by combining a polyol, an isocyanate, a blowing or expanding agent, and other materials such as catalysts and surfactants, to form a polyurethane reaction formulation. Thereafter, the polyurethane reaction formulation is allowed to expand either into an enclosed space or to expand unrestricted. For example, polyurethane foams using the mixture of the instant invention can be prepared by methods described in U.S. Pat. No. 4,411,949, which patent is incorporated herein by reference.

Based on the weight of the total polyurethane reaction formulation, the effective concentration of CFC-11, CFC-12, HCFC-22, HFC-32, CFC-113, CFC-114, HCFC-124, HCFC-133a, HFC-134a, HCFC-142b and HFC-152a can be about 0.1 to 25 wt. percent, preferably about 0.5 to 15 wt. percent.

The useful concentration range for the mixtures of the instant invention based on the weight of the polyurethane reaction formulation can be about 1 to 30 wt. percent based on the total polyurethane reaction formulation, with the preferred range being about 5 to 20 wt. percent. Since blowing agents are often dissolved (for handling convenience) in the polyol portion of the polyurethane reaction formulation to prepare "B-side systems", the useful concentration range of the mixture of the instant invention in the polyol may be about 2–60 wt. percent with the preferred range being about 10–40 wt. percent of the polyol.

EXAMPLES

In order to determine the amount of foam shrinkage which occurs in polyurethane foams using different blowing or expanding agents, samples of foams were prepared by hand mixing and aging, using the three basic polyurethane reaction formulations described in Table I.

Foams were prepared by mixing the indicated quantities of polyol and isocyanate as outlined in Table I for each of the three foam systems studied.

The blowing agents used were generally premixed with the polyol portion of the formulation for convenience. Blowing agents CFC-11, HCFC-123 and HCFC-141b were blended with the appropriate polyol in one pint glass jars; however, because of the higher pressures (and tendency for blowing agent loss if blended at atmospheric pressure), the other blowing agents evaluated were combined with the appropriate polyol in 8-ounce aerosol cans.

To allow time for a 15 sec. blending of the polyol containing the blowing agent and the isocyanate prior to the start of the reaction exotherm, the polyol and the isocyanate were separately cooled to −10° C. prior to mixing.

After cooling to −10° C., the polyol (containing the blowing agent, surfactant and catalyst) was added to the isocyanate and blended for 15 seconds using a high speed air driven mixer.

Foams were prepared by two techniques:

(1) After the 15 sec. mixing, the appliance foam reaction formulation was poured into a 2-½"×13"×15" mold (heated to 140° F.) and allowed to expand and fill the closed mold.

(2) After the 15 sec. mixing, the board stock reaction formulation was poured into a 5-qt. paint can liner and allowed to rise freely.

After allowing the foam samples to cure and cool to ambient temperature, the amount of shrinkage was determined as described below.

In the free rise samples, a center section (3"×3"×4") was removed for observation. All shrinkage measurements were made a minimum of 72 hours after foam formation.

Table II shows typical quantities of ingredients required for preparing a foam sample in the 2½"×13"×15" closed mold.

Table III shows shrinkage DATA.

Shrinkage Measurement (A) 2½"×13"×15" Closed Mold: Because foam shrinkage can be non-uniform, varying from irregular concave areas on sides of the foam blocks to significant volume contractions at the tops of the foam blocks, estimation of volume is difficult. Thus, a water immersion technique was developed. In this technique, the increased amount of water required to fill a plastic chamber containing the shrunken foam block versus the foam block exhibiting no shrinkage is a measure of the volume loss or shrinkage occurring after a given period of time.

The amount of shrinkage was calculated using the following formula:

$$E = \frac{B - D}{B} \times 100 = \text{percent shrinkage}$$

where

A=Volume of chamber to overflow
B=Original Volume of foam block before shrinkage occurs
C=Volume of water required to fill chamber to overflow with shrunken block in place
D=A-C=Volume of shrunken block The following is the Result of sample calculation with the indicated values:

| A | B | C | D | E |
|---|---|---|---|---|
| 9953 ml | 8255 ml | 2378 ml | 7575 ml | 8.3% |

(B) 3"×3"×4" Free Rise: Just as with the closed mold tests, the water immersion technique was used for determining shrinkage of the center sections (3"×3"×4") for free rise foam samples after a given period of time.

The amount of shrinkage was calculated using the following formula:

$$E = \frac{B - D}{B} \times 100 = \text{percent shrinkage}$$

where
A=Volume of chamber to overflow
B=Original Volume of foam block before shrinkage occurs
C=Volume of water required to fill chamber to overflow with shrunken block in place
D=A-C=Volume of shrunken block The following is the result of a sample calculation with the indicated values:

| A | B | C | D | E |
|---|---|---|---|---|
| 4000 ml | 3300 ml | 950 ml | 3050 ml | 7.5% |

TABLE I

POLYURETHANE SYSTEMS

| Polyurethane System | Foam Application | Iso-cyanate Index* | Polyol Type | Polyol Eq. Wt. | Iso-cyanate Type | Iso-cyanate Eq. Wt. | Comments |
|---|---|---|---|---|---|---|---|
| I | Appliance (pour-in-place) | 105 | Polyether | 133.6 | MDI | 134.0 | Polyol contains 1.43 percent water |
| II | Appliance | 100** | Polyether | 118.0 | TDI (modified) | 124.0 | Polyol contains 0.85 percent water |
| III | Insulating board stock (isocyanurate) | 250 | Polyester | 140.2 | MDI | 136.0 | |

*The number of equivalents of isocyanates per equivalent of hydroxyl in the polyol multiplied by 100.
**Approximate

TABLE II

TYPICAL FOAM FORMULATIONS

| Blowing Agent | Quantity g. | Polyurethane System | Polyol, g. | Isocyanate, g. | Blowing Agent Molecular Weight |
|---|---|---|---|---|---|
| CFC-11 | 44.0 | I | 100.0 | 122.7 | 137.4 |
| HCFC-123 | 49.0 | I | 100.0 | 122.7 | 153.0 |
| HCFC-141b | 37.4 | I | 100.0 | 122.7 | 116.9 |
| CFC-114 | 54.7 | I | 100.0 | 122.7 | 170.9 |

TABLE III

POLYURETHANE FOAM PREPARATION

POLYURETHANE SYSTEM (TABLE I) - I
FOAM PREPARATION PROCEDURE - CLOSED MOLD

| Blowing Agent | % B in | % A + B in | Moles A & B in CWT | Foam Density | % Volume Shrink- |
|---|---|---|---|---|---|

TABLE III-continued

POLYURETHANE FOAM PREPARATION

| A | B | A + B | Polymer | Polymer | #/cu. ft. | age |
|---|---|---|---|---|---|---|
| 11 | — | — | 16.5 | 0.144 | 1.90 | 0 |
| 123 | — | — | 17.8 | 0.142 | 2.13 | 35 |
| 123 | 11 | 5.0 | 17.8 | 0.142 | 2.11 | 0.5 |
| 123 | 11 | 10.0 | 17.7 | 0.142 | 2.17 | 0.25 |
| 123 | 11 | 15.0 | 17.6 | 0.142 | 2.10 | 0.25* |
| 123 | 11 | 20.0 | 17.6 | 0.142 | 2.10 | 0 |
| 123 | 11 | 40.0 | 17.4 | 0.142 | 2.20 | 0 |
| 123 | 11 | 10.0 | 19.4 | 0.160 | 2.06 | 0.1** |
| 123 | 11 | 65.0 | 17.7 | 0.151 | 2.12 | 0 |
| 123 | — | — | 17.8 | 0.142 | 2.13 | 35 |
| 123 | 12 | 5.0 | 17.7 | 0.142 | 2.15 | 7.2 |
| 123 | 12 | 10.0 | 17.5 | 0.142 | 1.96 | 5 |
| 123 | 12 | 15.0 | 17.3 | 0.142 | 2.01 | 2.9 |
| 123 | 12 | 20.0 | 17.1 | 0.142 | 1.95 | 1.3 |
| 123 | — | — | 17.8 | 0.142 | 2.13 | 35 |
| 123 | 22 | 5.0 | 17.3 | 0.142 | 2.01 | 15 |
| 123 | 22 | 10.0 | 16.8 | 0.142 | 2.10 | 3 |
| 123 | 22 | 20.0 | 16.0 | 0.142 | 2.23 | 2.2 |
| 123 | — | — | 17.8 | 0.142 | 2.13 | 35 |
| 123 | 114 | 5.0 | 17.9 | 0.142 | 2.15 | 9 |
| 123 | 114 | 12.0 | 18.0 | 0.142 | 2.13 | 4.2 |
| 123 | 114 | 15.0 | 18.1 | 0.142 | 2.14 | 2.3 |
| 123 | 114 | 20.0 | 18.2 | 0.142 | 2.14 | 1 |
| 123 | — | — | 17.8 | 0.142 | 2.13 | 35 |
| 123 | 124 | 20.0 | 17.5 | 0.142 | 2.01 | 0.3 |
| 123 | 134a | 20.0 | 16.5 | 0.142 | 1.90 | 2.4 |
| 123 | 142b | 20.0 | 16.4 | 0.142 | 2.16 | 0 |
| 123 | 152a | 20.0 | 14.7 | 0.142 | 2.15 | 0.9 |
| 11 | — | — | 16.5 | 0.144 | 1.90 | 0 |
| 11 | — | — | 24.1 | 0.231 | 1.35 | 0.8 |
| 141b | — | — | 20.1 | 0.215 | 1.40 | 44 |
| 141b | 11 | 20.0 | 20.6 | 0.215 | 1.42 | 3.2 |
| 141b | — | — | 20.1 | 0.215 | 1.40 | 44 |
| 141b | 12 | 20.0 | 20.2 | 0.215 | 1.31 | 22 |
| 141b | 12 | 40.0 | 20.3 | 0.215 | 1.46 | 3.5 |
| 141b | — | — | 20.1 | 0.215 | 1.40 | 44 |
| 141b | 22 | 5.0 | 19.8 | 0.215 | 1.42 | 43 |
| 141b | 22 | 10.0 | 19.5 | 0.215 | 1.33 | 39 |
| 141b | 22 | 20.0 | 19.0 | 0.215 | 1.43 | 16 |
| 141b | 22 | 40.0 | 18.0 | 0.215 | 1.32 | 9.4 |
| 141b | — | — | 20.1 | 0.215 | 1.40 | 44 |
| 141b | 114 | 20.0 | 21.2 | 0.215 | 1.44 | 20 |
| 141b | 114 | 40.0 | 21.4 | 0.215 | 1.34 | 2.7 |
| 141b | — | — | 20.1 | 0.215 | 1.40 | 44 |
| 141b | 124 | 20.0 | 20.6 | 0.215 | 1.43 | 8.8 |
| 141b | 134a | 20.0 | 19.6 | 0.215 | 1.36 | 4.7 |
| 141b | 142b | 20.0 | 19.6 | 0.215 | 1.39 | 2.3 |
| 141b | 152a | 20.0 | 17.9 | 0.215 | 1.32 | 5.3 |

FOAM PREPARATION

TABLE III-continued
POLYURETHANE FOAM PREPARATION

| POLYURETHANE SYSTEM (TABLE I) - II | | | | PROCEDURE - CLOSED MOLD | | |
|---|---|---|---|---|---|---|
| Blowing Agent A | B | % B in A + B | % A + B in Polymer | Moles A & B in CWT Polymer | Foam Density #/cu. ft. | % Volume Shrinkage |
| 11 | — | — | 16.4 | 0.144 | 1.37 | 0 |
| 123 | — | — | 21.5 | 0.180 | 1.77 | 3 |
| 123 | 11 | 5.0 | 22.4 | 0.190 | 1.80 | 3 |
| 123 | 11 | 5.0 | 21.4 | 0.180 | 1.77 | 2.5 |
| 123 | 11 | 10.0 | 23.3 | 0.202 | 1.81 | 2 |
| 123 | 11 | 15.0 | 24.4 | 0.215 | 1.73 | 0.6 |
| 123 | 11 | 15.0 | 21.2 | 0.180 | 1.76 | 0.1 |
| 123 | 11 | 20.0 | 25.5 | 0.230 | 1.65 | 0.2 |
| 123 | 11 | 20.0 | 21.1 | 0.179 | 1.75 | 0 |
| 123 | — | — | 23.4 | 0.200 | 1.59 | 16.1 |
| 123 | 11 | 10.0 | 23.2 | 0.200 | 1.59 | 5.4 |
| 123 | 12 | 10.0 | 22.9 | 0.200 | 1.53 | 3.7 |
| 123 | 22 | 10.0 | 22.2 | 0.200 | 1.53 | 5.1 |
| 123 | 114 | 10.0 | 23.6 | 0.200 | 1.60 | 8.8 |
| 123 | 124 | 10.0 | 23.2 | 0.200 | 1.61 | 0 |
| 123 | 134a | 10.0 | 22.6 | 0.200 | 1.49 | 0.8 |
| 123 | 142b | 10.0 | 22.5 | 0.200 | 1.58 | 0 |
| 123 | 152a | 10.0 | 21.3 | 0.200 | 1.50 | 2.1 |
| 141b | — | — | 18.9 | 0.390 | 1.41 | 15 |
| 141b | 11 | 10.0 | 19.2 | 0.391 | 1.42 | 4.8 |
| 141b | 12 | 10.0 | 19.0 | 0.391 | 1.37 | 9.5 |
| 141b | 22 | 10.0 | 18.4 | 0.391 | 1.40 | 3.5 |
| 141b | 114 | 10.0 | 19.5 | 0.391 | 1.47 | 2.8 |
| 141b | 124 | 10.0 | 19.2 | 0.391 | 1.46 | 1.8 |
| 141b | 134a | 10.0 | 18.7 | 0.391 | 1.42 | 6 |
| 141b | 142b | 10.0 | 18.7 | 0.391 | 1.39 | 5.7 |
| 141b | 152a | 20.0 | 16.8 | 0.180 | 1.44 | 10.5 |

| POLYURETHANE SYSTEM (TABLE I) - III | | | | FOAM PREPARATION PROCEDURE - FREE RISE | | |
|---|---|---|---|---|---|---|
| Blowing Agent A | B | % B in A + B | % A + B in Polymer | Moles A & B in CWT Polymer | Foam Density #/cu. ft. | % Volume Shrinkage |
| 11 | — | — | 19.8 | 0.180 | 1.52 | 0 |
| 123 | — | — | 21.6 | 0.180 | 1.42 | 33 |
| 123 | 11 | 5.0 | 21.5 | 0.180 | 1.43 | 15 |
| 123 | 11 | 10.0 | 21.4 | 0.180 | 1.44 | 10 |
| 123 | 11 | 15.0 | 21.3 | 0.180 | 1.43 | 6 |
| 123 | 11 | 20.0 | 21.2 | 0.180 | 1.40 | 5 |
| 123 | 11 | 25.0 | 21.1 | 0.180 | 1.42 | 4 |
| 123 | 11 | 30.0 | 21.0 | 0.180 | 1.44 | 3 |
| 123 | 11 | 65.0 | 21.6 | 0.180 | 1.39 | 0 |
| 141b | — | — | 17.4 | 0.180 | 1.54 | 34 |
| 141b | 11 | 20.0 | 17.8 | 0.180 | 1.71 | 0.2 |
| 141b | — | — | 17.4 | 0.180 | 1.54 | 34 |
| 141b | 124 | 20.0 | 19.4 | 0.180 | 1.37 | 9.1 |
| 141b | 142b | 20.0 | 18.5 | 0.180 | 1.38 | 5.9 |

*Less than
**Aproximate

I claim:

1. A process comprising
   mixing at least 1 wt. percent to 59 wt. percent of a shrinkage-minimizing halocarbon selected from the group consisting of CFC-11, CFC-12, HCFC-22, HFC-32, CFC-113, CFC-114, HCFC-124, HCFC-133a, HFC-134a, HCFC-142b and HFC-152a, and 99 to 41 wt. percent of a two-carbon hydrogen-containing halocarbon selected from the group consisting of HCFC-123, HCFC-123a and HCFC-141b, to form a mixture, and, thereafter,
   using the mixture to produce a minimal shrinkage closed-cell polyurethane foam.

2. The process of claim 1 wherein the mixture is first dissolved in a polyol containing a surfactant and catalyst to form a B-side system which is, in turn, reacted with isocyanates to produce said polyurethane foam, said mixture comprising about 2 to 60 wt. percent of the B-side system.

3. The process of claim 1 wherein the mixture is combined with surfactant and an isocyanate to form one component and, thereafter, the component is reacted with a polyol and a catalyst to produce said closed-cell polyurethane foam.

4. The process of claim 1 wherein the mixture comprises about 10 to 40 wt. percent of the shrinkage-minimizing halocarbon and about 90 to 60 wt. percent of the two-carbon hydrogen-containing halocarbon.

5. The process of claim 1 wherein the mixture comprises about 80 wt. percent HCFC-123 and about 20 wt. percent HCFC-11.

6. The process of claim 1 wherein the shrinkage-minimizing halocarbon comprises about 0.1 to 25 wt. percent of a polyurethane reaction formulation.

7. The process of claim 6 wherein the shrinkage-minimizing halocarbon comprises about 0.5 to 15 wt. percent of the polyurethane reaction formulation.

8. The process of claim 1 wherein the polyurethane foam has a density of about 1.5 to 2.5 pounds per cubic foot.

9. The process of claim 1 wherein the polyurethane foam has a density of about 1.2 to 1.5 pounds per cubic foot.

* * * * *